US007516533B2

(12) United States Patent
Mossbeck et al.

(10) Patent No.: US 7,516,533 B2
(45) Date of Patent: Apr. 14, 2009

(54) POSITIONING DEVICE FOR STAPLE GUNS AND METHOD OF USE

(75) Inventors: Niels S. Mossbeck, Carthage, MO (US); Franklin H. Rawlings, Diamond, MO (US); Michael L. Shelton, Joplin, MO (US)

(73) Assignee: L&P Property Management Company, South Gate, CA (US)

(*) Notice: Subject to any disclaimer, the term of this patent is extended or adjusted under 35 U.S.C. 154(b) by 175 days.

(21) Appl. No.: 11/059,940

(22) Filed: Feb. 17, 2005

(65) Prior Publication Data

US 2005/0251981 A1 Nov. 17, 2005

Related U.S. Application Data

(60) Provisional application No. 60/561,543, filed on Apr. 9, 2004.

(51) Int. Cl.
*B23P 11/00* (2006.01)
*B27F 7/00* (2006.01)

(52) U.S. Cl. ........................... 29/432; 29/91.1; 29/798; 29/33 K; 227/110; 227/100

(58) Field of Classification Search .................. 29/432, 29/91.1, 33 K, 798, 700, 281.6; 227/153, 227/152, 159, 50, 30, 29, 28, 37, 40, 110, 227/100, 2, 5
See application file for complete search history.

(56) References Cited

U.S. PATENT DOCUMENTS 2,169,433 A 8/1939 Roy ............................ 227/10
2,578,212 A 12/1951 Warren
2,638,153 A 5/1953 Clark
2,946,060 A 7/1960 Powers ....................... 227/120
3,023,417 A 3/1962 Michel
3,084,345 A 4/1963 Hodges, Jr. .................. 227/20
3,168,745 A 2/1965 Winters
3,190,522 A 6/1965 Winters ....................... 227/40
3,737,927 A 6/1973 Kline et al. .................... 5/260
3,753,404 A 8/1973 Bryan, Jr. .................. 104/17.1
3,770,180 A 11/1973 Stumpf
3,789,495 A 2/1974 Stumpf ........................ 29/429

(Continued)

*Primary Examiner*—Essama Omgba
(74) *Attorney, Agent, or Firm*—Wood, Herron & Evans, LLP

(57) ABSTRACT

Apparatus for manufacturing a bedding foundation having a base and a wire grid of support wires comprises at least one vertically moveable staple gun having a staple head and a wire positioner associated with the staple head, the wire positioner being configured to engage one of the support wires and to position the one support wire relative to the staple head such that upon activation, the staple gun staples the one support wire in the intended position to the base. Apparatus for manufacturing a bedding foundation having a base and a wire grid of support wires comprises at least one vertically moveable staple gun for stapling the wire grid to the base, a support for supporting the base, a horizontally moveable carriage having a first gripper for gripping the wire grid and a second gripper for gripping the base, the carriage for indexing the wire grid and base beneath said staple gun, and a controller for controlling gripping of the grippers, horizontal movement of the carriage, vertical movement of the staple gun, and stapling of the wire grid to the base by the staple gun.

48 Claims, 14 Drawing Sheets

U.S. PATENT DOCUMENTS

| | | | | |
|---|---|---|---|---|
| 4,087,035 | A | 5/1978 | Harmon | |
| 4,152,558 | A | 5/1979 | Newman | 200/61.42 |
| 4,380,312 | A | 4/1983 | Landrus | |
| 4,389,011 | A | 6/1983 | Lovibond | |
| 4,453,661 | A | 6/1984 | Genyk et al. | |
| 4,493,322 | A | 1/1985 | Becht | |
| 4,518,907 | A | 5/1985 | Giguere | |
| 4,553,689 | A | 11/1985 | Wilkerson | |
| 4,652,806 | A | 3/1987 | Aiello | |
| 4,876,787 | A | 10/1989 | Ditty et al. | 29/430 |
| 4,929,879 | A | 5/1990 | Wright et al. | |
| 4,989,438 | A | 2/1991 | Simon | |
| 4,995,087 | A | 2/1991 | Rathi et al. | |
| 5,052,064 | A | 10/1991 | Hagemeister et al. | 5/246 |
| 5,054,678 | A | 10/1991 | Nasiatka | 227/8 |
| 5,083,073 | A | 1/1992 | Kato | |
| 5,194,791 | A | 3/1993 | Cull | |
| 5,321,353 | A | 6/1994 | Furness | |
| 5,361,434 | A | 11/1994 | Hagemeister | 5/247 |
| 5,422,835 | A | 6/1995 | Houle et al. | 708/103 |
| 5,425,489 | A | 6/1995 | Shichman et al. | |
| 5,483,440 | A | 1/1996 | Aono et al. | |
| 5,497,541 | A | 3/1996 | Nogueira | 29/33 K |
| 5,533,146 | A | 7/1996 | Iwai | |
| 5,583,620 | A | 12/1996 | Miyamoto | |
| 5,611,130 | A | 3/1997 | Rummell et al. | 29/34 B |
| 5,772,096 | A | 6/1998 | Osuka et al. | 227/5 |
| 5,904,789 | A | 5/1999 | Durkos | 156/64 |
| 6,220,494 | B1 | 4/2001 | Raffoni | 227/2 |
| 6,460,749 | B1 | 10/2002 | Levinson et al. | |
| 6,568,669 | B2 | 5/2003 | Hosaka | |
| 6,935,546 | B2 | 8/2005 | Durkos | 227/110 |
| 7,222,402 | B1 * | 5/2007 | Durkos | 29/91.1 |
| 7,467,454 | B2 * | 12/2008 | Durkos | 29/432 |
| 2005/0210647 | A1 * | 9/2005 | Durkos | 29/91.1 |

* cited by examiner

POSITIONING DEVICE FOR STAPLE GUNS AND METHOD OF USE

RELATED APPLICATIONS

This application claims the benefit, and is a continuation-in-part, of provisional application Ser. No. 60/561,543 filed Apr. 9, 2004, and hereby incorporated by reference herein as if fully set forth in its entirety.

FIELD OF THE INVENTION

This invention relates generally to bedding products and more particularly to bedding foundations and the method of making the same.

BACKGROUND OF THE INVENTION

Bedding foundations or so-called box spring assemblies comprise a base, usually made of wood, an upper grid including a generally rectangular border wire and a plurality of spring modules sandwiched between and secured to the upper grid and base. Such box spring assemblies or bedding foundations are bulky for purposes of shipping to a bedding manufacturer and costly in terms of storage space. When such a bedding foundation is shipped to a bedding manufacturer, the space and shipping costs are increased and ultimately passed on to the customer.

In order to reduce the space requirements for purposes of shipping, it is customary to compress the bedding foundations to reduce their individual thicknesses and when compressed, to tie them in their compressed state. This involves providing presses and ties which are expensive to acquire and maintain. Additionally, the step of compressing and tying the compressed foundations adds extra time to the shipping process. At the delivery end, the bedding manufacturer must cut the tensioned ties and separate the individual foundation units before applying the requisite padding and covering. Due to the high tension of the ties, this process may be dangerous and requires great care on the part of the bedding manufacturer.

Bedding foundation assemblies are known which may be stacked prior to shipping and shipped as stacks of individual components. Shipping in this manner eliminates the need to compress a plurality of partially assembled bedding foundations for shipping purposes. Applicant's U.S. Pat. Nos. 5,052,064 and 5,361,434, each of which is fully incorporated by reference herein, disclose bedding foundations which may be shipped to a bedding manufacturer in this stacked manner. Multiple spring modules are commonly welded or otherwise secured to an upper grid which may be nestably stacked upon other similar subassemblies for shipping and/or storage purposes. Likewise, the wooden bases may be stacked for shipping and/or storage purposes. Upon arrival at the manufacturing facility, the bedding manufacturer removes the stacked components and assembles them as required to construct a bedding foundation before application of padding and covering. Oftentimes the upper grid and support wires are welded or otherwise secured together to create a spring assembly which may be unstacked and stapled or otherwise secured to a wooden base.

One difficulty bedding manufacturers encounter when constructing a bedding foundation like the one shown in applicant's U.S. Pat. No. 5,052,064 is that an operator must staple each valley of each generally corrugatedly-shaped support wire to the wooden base. This stapling process takes a great deal of time and is therefore, expensive. If performed manually, this process is subject to human error because the operator must properly align each support wire and be sure to staple each valley of each support wire to one of the rails of the wooden base. If automated, this process is subject to error because the stapling machine may fail to detect each valley of each support wire and consequently fail to staple each valley of each support wire to one of the rails of the wooden base.

Another difficulty bedding manufacturers encounter when constructing a bedding foundation like the one shown in applicant's U.S. Pat. No. 5,052,064 is that oftentimes some of the corrugatedly-shaped support wires are bent or otherwise deformed during shipment. Consequently, when the support wires of the spring assembly are stapled to a wooden base, the support wires may be incorrectly positioned relative to the wooden base. The result is a bedding foundation in which one or more of the corrugatedly-shaped support wires are stapled to the base in the wrong locations or missed partially or entirely by the stapler.

Therefore, there is a need for a stapling device which automatically staples the valleys of corrugatedly-shaped support wires to a wooden base in their correct locations. There is further a need for a method of stapling corrugatedly-shaped support wires to a wooden base in the correct positions, even if the support wires are bent.

SUMMARY OF THE INVENTION

This invention relates generally to a method of manufacturing a foundation like the one shown in applicant's U.S. Pat. No. 5,052,064. The present invention eliminates the ambiguities and inaccuracies that accompany the current method of manufacturing such bedding foundations. Of course, the method of this invention may be used to manufacture any bedding or seating product.

One aspect of the present invention comprises a method of manufacturing a seating or bedding foundation. The method comprises providing a base having a plurality of rails. The base is preferably made of wood, but may be made of any suitable material. In one preferred embodiment, the base includes a pair of opposed end rails, a pair of opposed side rails and a plurality of transversely extending cross rails extending between the side rails. In an alternative embodiment, the cross rails may be longitudinally extending from one end rail to the other end rail.

The method further comprises positioning a plurality of support wires above the base arranged in parallel, each of said support wires having a plurality of aligned peaks and valleys such as shown in U.S. Pat. No. 5,052,064. The valleys of the support wires rest on the rails of the base.

The next step in the method is providing at least one staple gun, each staple gun having a staple head located at the bottom of the staple gun. The staple head of the staple gun is positioned such that upon activation after being lowered, the staple gun staples one of the valleys of one of the support wires to one of the rails of the base. Each staple head has a positioner attached thereto. The staple head has one groove on the bottom of the staple head and the positioner has two grooves on the sides thereof. When the staple head is lowered with the staple gun, the grooves on the sides of the positioner contact portions of a support wire and guide the support wire into proper position relative to the rails of the base. The lower groove on the staple head contacts the valley of the support wire and holds it in position so that upon activation, the staple gun staples the support wire to the base in its intended location.

In one preferred embodiment of the present invention, a plurality of staple guns are mounted on a horizontally oriented mounting bar or support which is vertically moveable.

Each of the staple guns has a staple head located on the bottom of the staple gun. Each of the staple heads has a groove which engages or contacts one of the valleys of one of the support wires immediately prior to stapling. Each of the staple heads has a positioner for positioning the staple head and moving the support wire so that upon activation the staple gun staples one of the valleys of one of the support wires in the proper position to one of the base rails.

A second aspect of the present invention comprises an apparatus for automatic stapling of wire components to wooden slats or rails of a base. The apparatus comprises a mounting frame including a pair of vertically oriented guide bars which guide a horizontally oriented mounting bar or support. One or more staple guns are mounted to the mounting bar in any suitable manner. The mounting bar moves vertically relative to the bedding foundation and consequently the staple guns move vertically. An electronic controller controls movement of the mounting bar, among other movements.

In one preferred embodiment, the mounting frame may be moveable in a horizontal manner relative to a stationary table on which are located one or more bedding foundations to be stapled.

In an alternative embodiment, the mounting frame is stationary. In this alternative embodiment, a conveyor or other apparatus moves bedding foundations to be stapled, one at a time, into position underneath the mounting frame so that when the mounting bar and stapling gun is lowered, the proper support wires are stapled to the base in the proper locations. The bedding foundation being stapled is indexed along at the proper speed as determined by the controller so that upon being lowered and activated the staple guns simultaneously staple the valleys of the support wires to the base rails.

Each staple gun has a staple head at the bottom thereof. If desired, the staple head may be positioned at another location relative to the staple gun. Each staple head has a positioner specifically configured as described above to guide the staple head to the correct location. An additional function of the apparatus of the present invention is that the configuration of both the staple head and positioner helps guide the support wire into the proper position relative to the rails of the base should one or more of the support rails be bent or otherwise deformed.

In another aspect, the invention is apparatus for manufacturing a bedding foundation having a base and a wire grid of support wires. The apparatus comprises at least one vertically moveable staple gun having a staple head and a wire positioner associated with the staple head, the wire positioner being configured to engage one of the support wires and to position the one support wire relative to the staple head such that upon activation, the staple gun staples the one support wire in the intended position to the base.

The support wires have peaks, valleys, and connecting segments joining the peaks and valleys. One type of wire positioner can be configured to engage at least one of the connecting segments of a respective valley. The wire positioner can include a groove which engages the at least one of the connecting segments of the respective valley, or a pair of opposed grooves which engage both of the connecting segments of the respective valley. The wire positioner can include a central hole permitting passage of the staple head therethrough and a pair of opposed grooves which engage both of the connecting segments of the respective valley.

Another type of wire positioner can be configured to engage a respective valley. The wire positioner can have a pair of jaws configured to grip the respective valley when the staple head approaches the valley. The wire positioner can include a linkage for moving the pair of jaws to grip the respective valley. The wire positioner can include an actuator which contacts the base and actuates the linkage to move the pair of jaws. The actuator can be spring biased so as to normally position the pair of jaws in an open position. The wire positioner can include a housing, the pair of jaws can be pivoted to the housing, the actuator can be mounted for sliding movement in the housing, and the linkage can comprise first and second links, each of the first and second links having a first end pivoted to a respective one of the pair of jaws, the first and second links having second ends pivoted to one another and to the actuator, whereby when the actuator is biased toward the housing the first and second links pivot oppositely and in so doing cause the pair of jaws to pivot oppositely toward a closed position. The actuator can include a pair of legs which straddle the valley of the respective wire.

The apparatus can include either or both of the two types of wire positioners.

In yet another aspect, the invention is apparatus for manufacturing a bedding foundation having a base and a wire grid of support wires comprising at least one vertically moveable staple gun for stapling the wire grid to the base, a support for supporting the base, a horizontally moveable carriage having a first gripper for gripping the wire grid and a second gripper for gripping the base, the carriage for indexing the wire grid and base beneath the staple gun, and a controller for controlling gripping of the grippers, horizontal movement of the carriage, vertical movement of the staple gun, and stapling of the wire grid to the base by the staple gun.

The apparatus can further include a first sensor associated with the first gripper and a second sensor associated with the second gripper, the sensors for sending respective signals to the controller that the wire grid and base are in position to be gripped by the grippers. The controller can control downward movement of the staple gun and stapling of the wire grid to the base by the staple gun such that the staple gun is moved downwardly and the wire grid is stapled to the base after the first and second grippers grip the wire grid and base, respectively. The controller can control upward movement of the staple gun such that the staple gun is moved upwardly to a start position after the wire grid is stapled to the base. The controller can control horizontal movement of the carriage such that the wire grid and base are progressively indexed forwardly under the staple gun so that the staple gun can completely staple the wire grid to the base. The first and second grippers can be mounted for vertical movement on the carriage and the controller can control vertical movement of the grippers such that after the carriage has indexed the wire grid and base completely beneath the staple gun and the staple gun has completely stapled the wire grid to the base, the grippers can be moved downwardly to a position below the support, the carriage can be moved rearwardly to a start position, and the grippers can be moved upwardly to a start position for gripping the wire grid and base of the next bedding foundation.

The apparatus can also include either or both of the two types of wire positioners.

DETAILED DESCRIPTION OF THE DRAWINGS

Figure 1A:
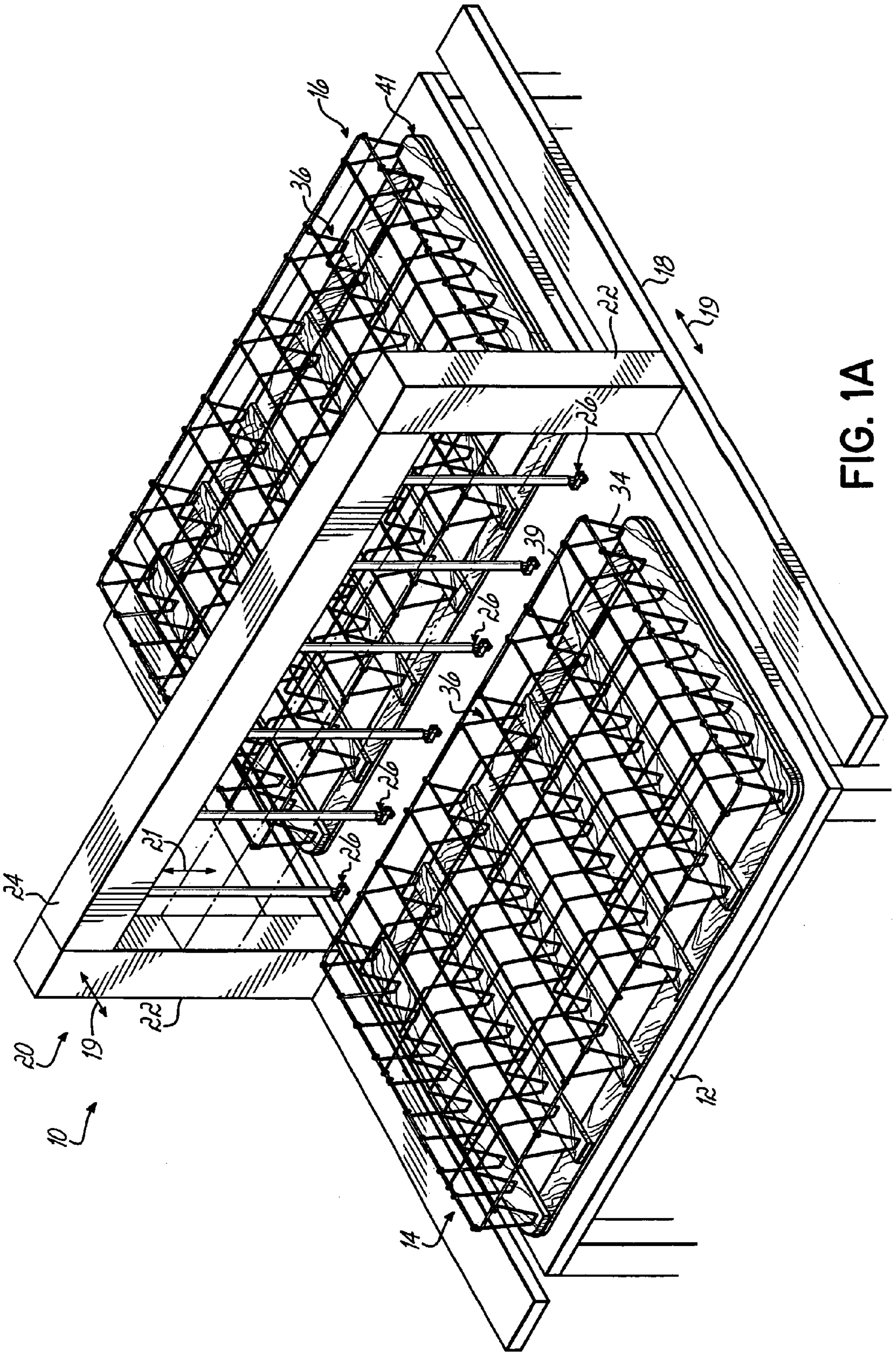
FIG. 1A is a perspective view of one preferred embodiment of the apparatus of the present invention.

Referring to the drawings and particularly FIG. 1A, one preferred embodiment of the apparatus of the present invention is illustrated. FIG. 1A illustrates a stapling apparatus 10 comprising a support table 12 on which are located a first bedding foundation to be stapled 14 and a second bedding foundation to be stapled 16. Although the support table 12 is illustrated as being large enough to support two bedding foundations, the support table may be any size to support any number of bedding foundations.

In this preferred embodiment of apparatus 10, a pair of guides 18 are located on opposite sides of the support table 12. A mounting frame 20 is mounted on the guides 18 and moveable thereon. The mounting frame 20 includes a pair of vertically oriented guide bars 22 which are movable on the guides 18 as indicated by the arrow 19. A horizontally oriented mounting bar or support 24 extends between the guide bars 22 and is movable relative thereto in a vertical direction as indicated by arrow 21. The mounting bar 24 is movable between a raised position and a lowered position via a controller. The mounting bar 24 is illustrated in FIG. 1A in its raised position so that the mounting frame 20 assumes a generally U-shape. Any other means may be utilized to move the guide bars 22 of the mounting frame 20 relative to the stationary table 12 and/or to move the mounting bar 24 in a vertical direction.

Figure 2A:
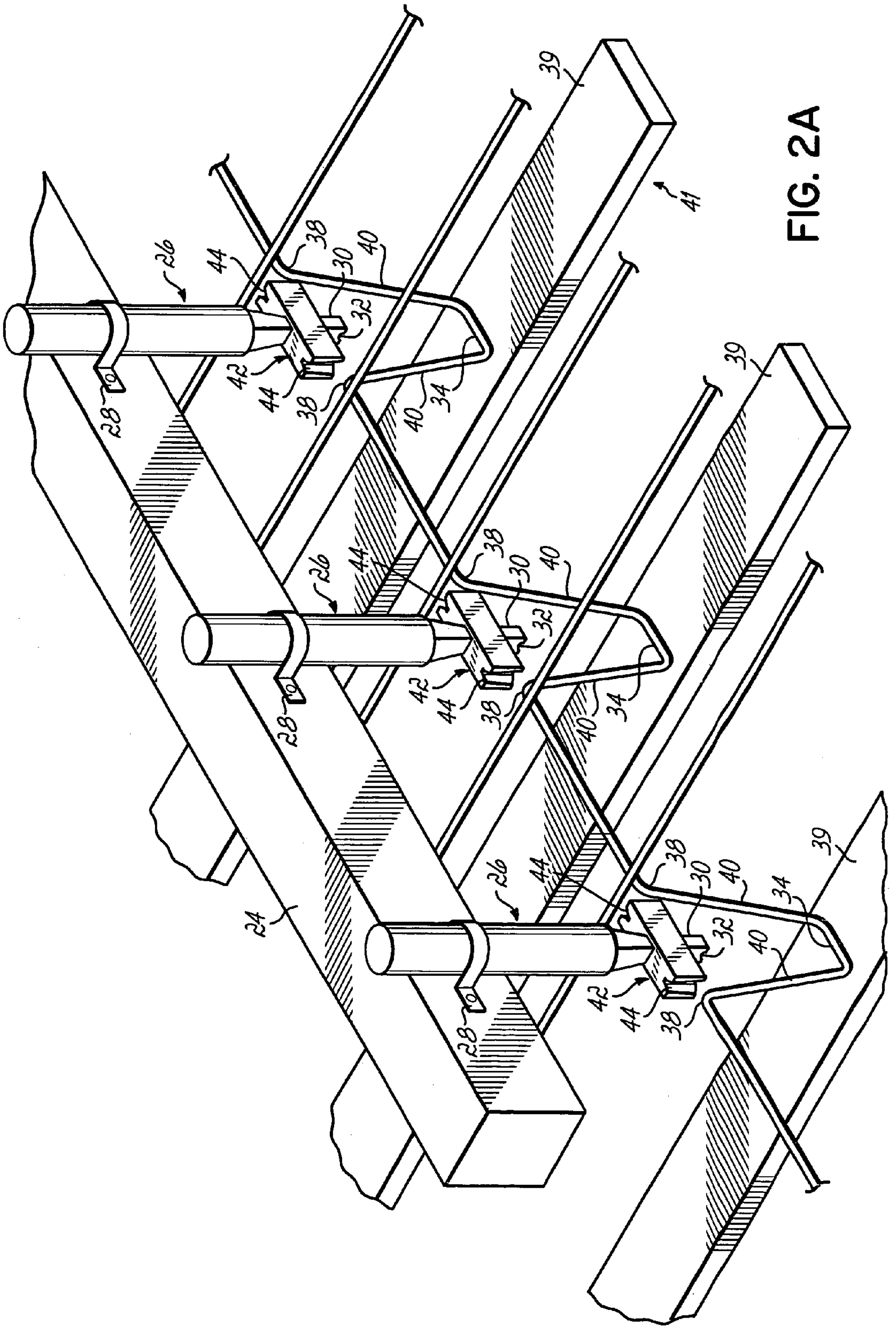
FIG. 2A is an enlarged perspective view of multiple staple guns in a raised position in accordance with one preferred embodiment of the present invention.
Figure 2B:
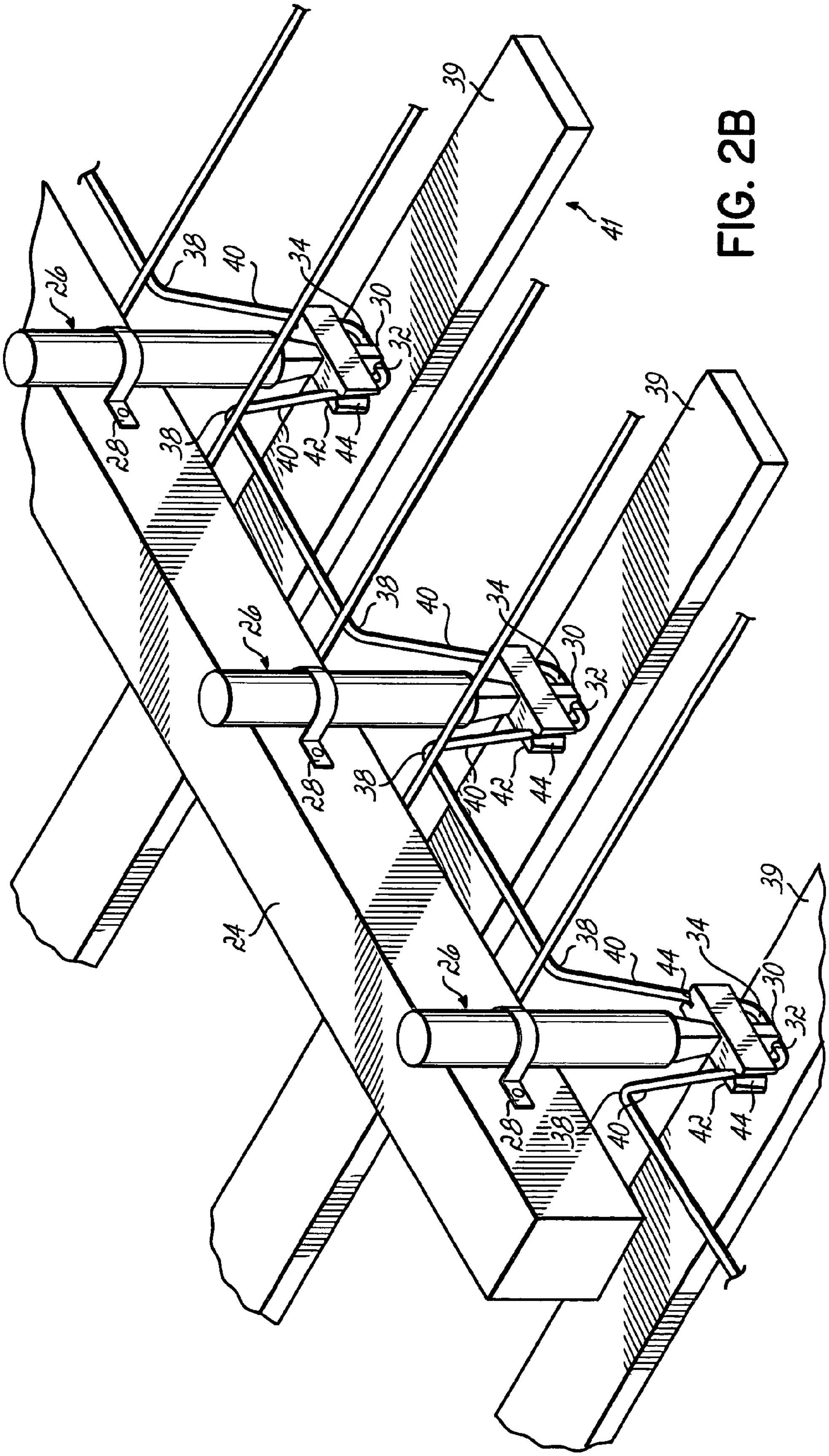
FIG. 2B is an enlarged perspective view of the staple guns of FIG. 2A in a lowered position.

As best shown in FIGS. 2A and 2B, a plurality of staple guns 26 are secured at spaced locations to the mounting bar 24 with clamps 28. Any other means of securing the staple guns 26 to the mounting bar 24 may be utilized if desired. Although three staple guns 26 are illustrated in FIGS. 2A and 2B, any number of staple guns 26 may be mounted on the mounting bar 24 in any desired manner. At the lower end of each staple gun 26 is a staple head 30 having a groove 32 for receiving one of the valleys 34 of one of the support wires 36. As shown in FIGS. 2A and 2B, each support wire 36 (only one being shown) has a plurality of spaced valleys 34, peaks 38 and connecting segments 40 joining the valleys 34 and peaks 38 as disclosed in U.S. Pat. No. 5,052,064. The purpose of the stapling apparatus 10 of the present invention is to secure the support wires 36 to the rails 39 of the base 41 in their intended locations.

As shown in FIGS. 2A and 2B, each staple head 30 has a positioner 42 secured thereto to contact the connecting segments 40 of the support wire 36 and guide the staple head 30 into its intended position as the staple guns 26 are lowered so that the valleys 34 of the support wires 36 end up in the grooves 32 of the staple heads 30. The positioners 42 are preferably made of plastic, but may be made of any suitable material. Each positioner 42 has a pair of opposed grooves 44 sized to receive the connecting segments 40 of the support wire 36 and guide the staple head 30 as it is being lowered by the mounting bar 24. The positioner 42 also guides and moves the support wire 36 to its proper position as the staple heads 30 on the staple guns 26 are lowered so that when stapling occurs the valleys 34 of the support wire 36 are in the correct locations.

Figure 3:
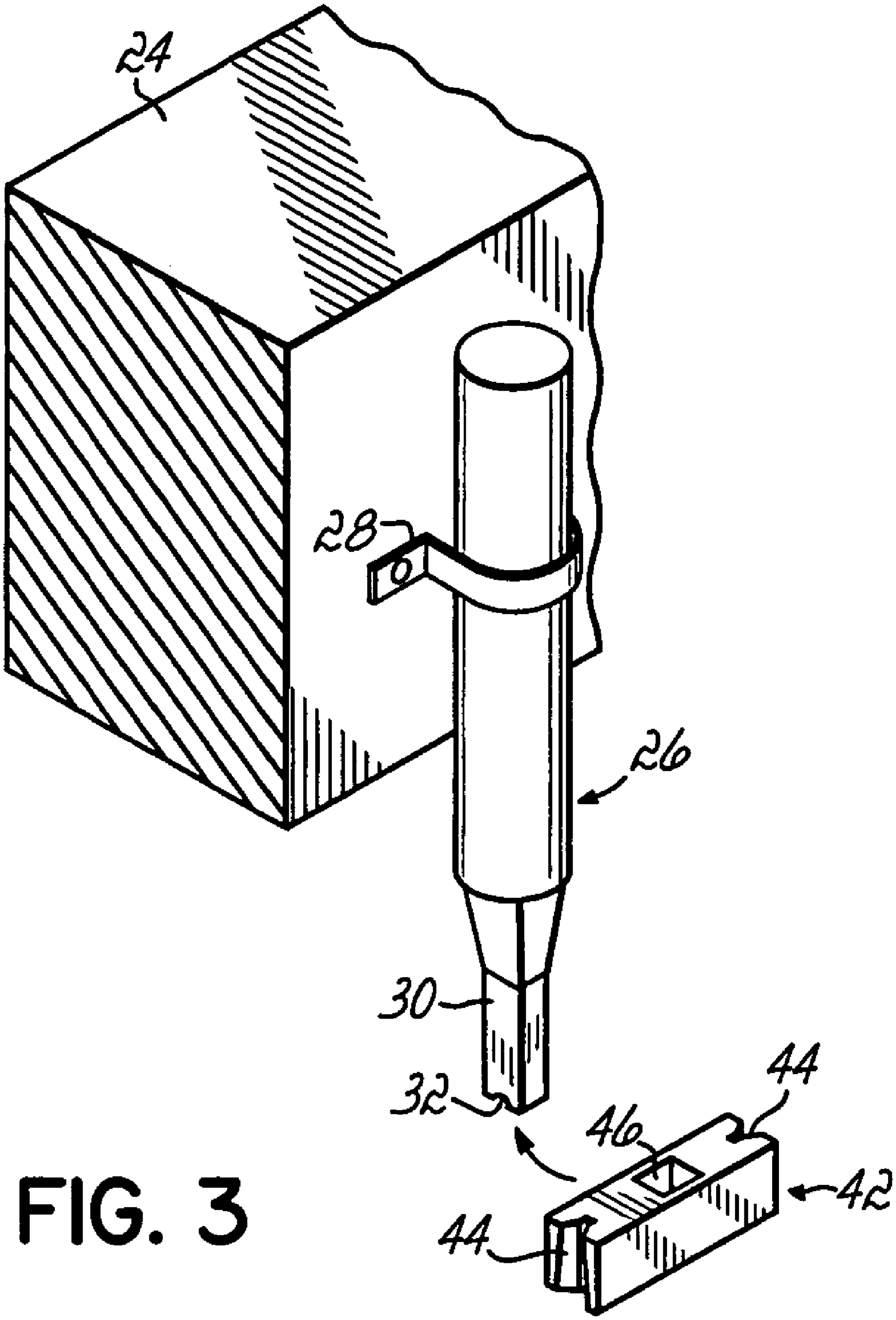
FIG. 3 is an enlarged partially disassembled view of a one of the staple heads of the present invention.
Figure 4:
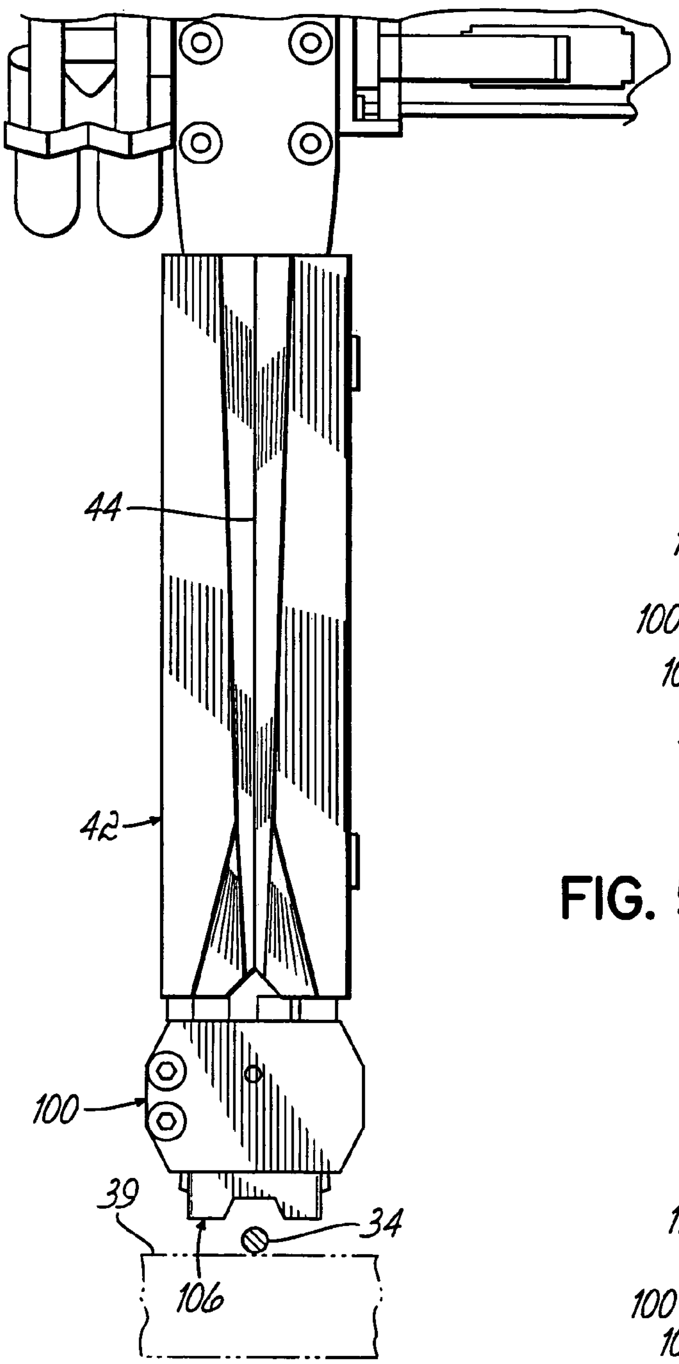
FIG. 4 is a side view of a second wire positioner utilized in conjunction with the first wire positioner of FIGS. 1-3.

As shown in FIG. 3, each positioner 42 has a hole 46 therethrough through which the staple head 30 passes. Thus, the positioner 42 may be removed when damaged or not functioning properly. If desired the positioners 42 may be permanently secured to the staple heads 30 of the staple guns 26.

FIG. 2A illustrates the mounting bar 24 and staple guns 26 secured to the mounting bar 24 in a raised position. FIG. 2B illustrates the mounting bar 24 and staple guns 26 secured to the mounting bar 24 in a lowered position for stapling. When the mounting bar 24 and accompanying staple guns 26 are in a raised position, the bedding foundation may be moved so that another support wire 36 is located underneath the staple guns 26 as in the embodiment shown in FIG. 1B. Alternatively, the bedding foundation may remain stationary and the mounting bar 24 with accompanying staple guns 26 indexed in the direction of arrow 46 to the next support wire 36 as in the embodiment shown in FIG. 1A.

Figure 1B:
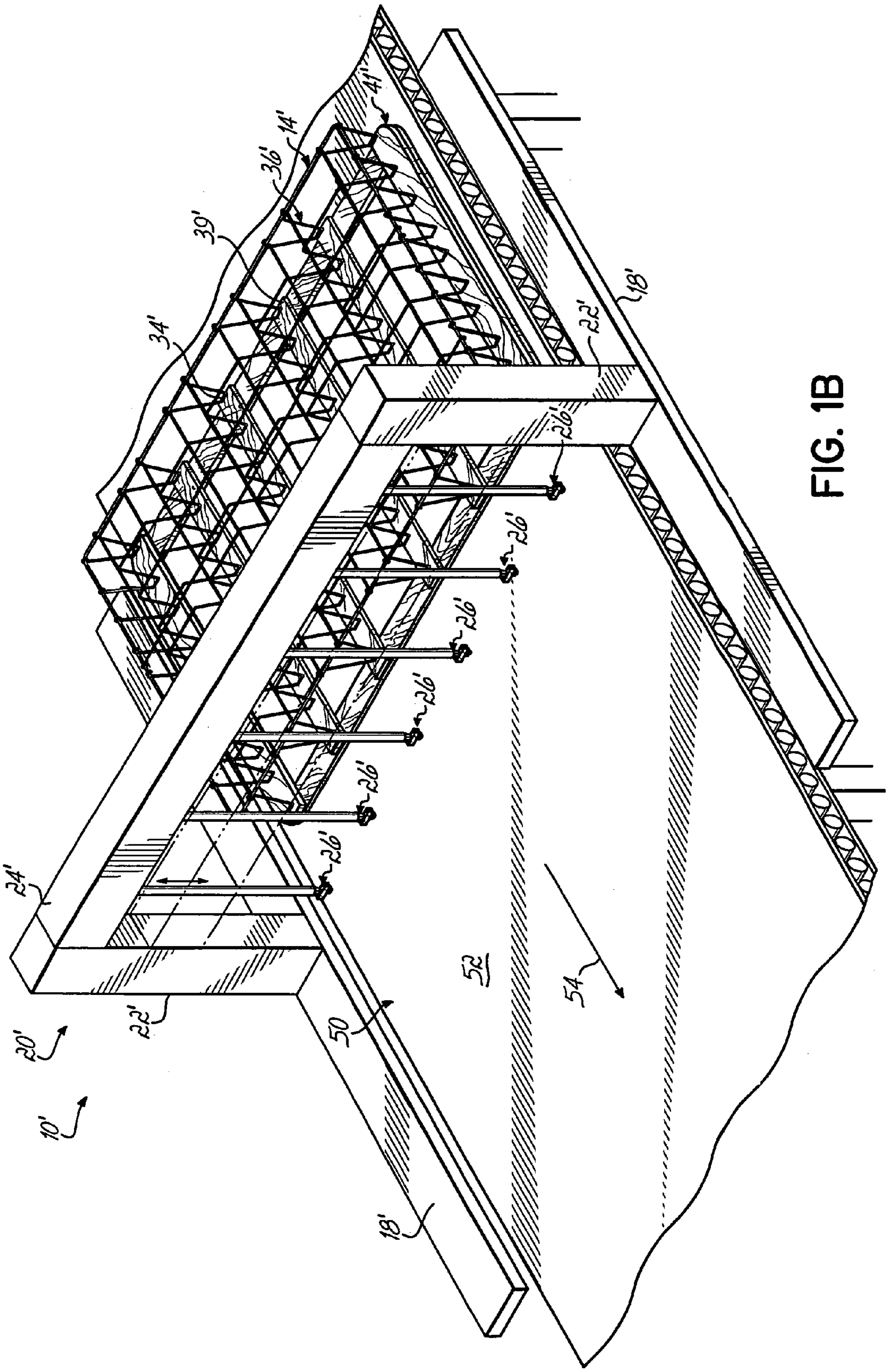
FIG. 1B is a perspective view of another preferred embodiment of the apparatus of the present invention.

FIG. 1B illustrates an alternative preferred embodiment of the apparatus of the present invention. FIG. 1B illustrates a stapling apparatus 10' comprising a conveyor 50 or movable support on which is located a bedding foundation to be stapled 14'. In this embodiment, the bedding foundation 14' comprises a base 41' having transversely extending cross rails 39' to which the valleys 34' of the longitudinally extending support wires 36' are to be stapled. Although one type of conveyor is illustrated comprising an endless belt 52 movable in the direction 54, the conveyor or mover may assume other configurations.

In this preferred embodiment of apparatus 10', a mounting frame 20' is mounted in a stationary position. The mounting frame 20' includes a pair of vertically oriented guide bars 22' which are stationary. A horizontally oriented mounting bar or support 24' extends between the fixed guide bars 22' and is movable relative thereto in a vertical direction. The mounting bar 24' is movable between a raised position and a lowered position via a controller. The mounting bar 24' is illustrated in FIG. 1B in its raised position so that the mounting frame 20' assumes a generally U-shape.

A plurality of staple guns 26' are secured at spaced locations to the mounting bar 24' in any desired manner. Although six staple guns 26' are illustrated in FIG. 1B, any number of staple guns 26' may be mounted on the mounting bar 24' in any desired manner. At the lower end of each staple gun 26' is a staple head 30' and a positioner 42' as described above.

When the mounting bar 24' is raised, the conveyor 50 moves or indexes the bedding foundation 14' a predetermined distance so that the next support bar 36' may be stapled to the rails 39' of the base 41'. When the mounting bar 24' is lowered the staple heads 30' contact the valleys 34' of the support wires 36' and staple them together as described above.

Figure 5:
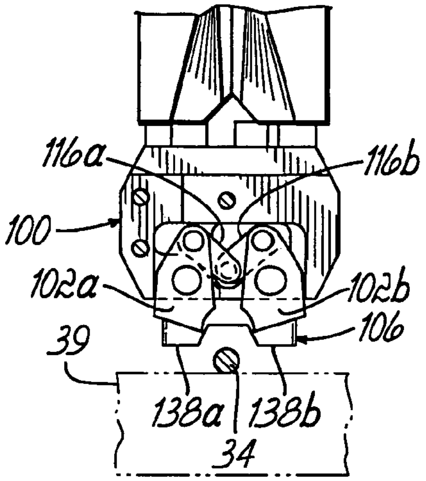
FIG. 5 is a partial side view, similar to FIG. 4, but with one-half of the second wire positioner removed for clarity.
Figure 6:
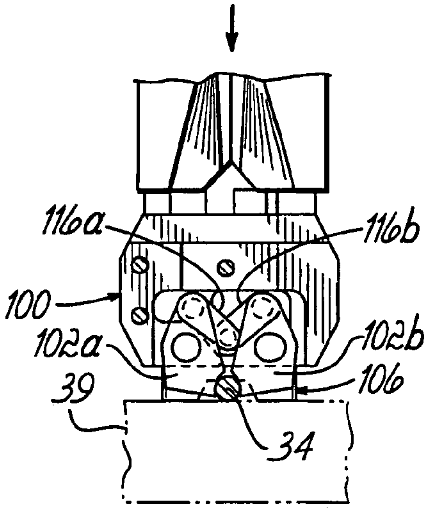
FIG. 6 is a view similar to FIG. 5 but of the wire positioner in a lowered position.

Referring now to FIGS. 4-7, there is illustrated another wire positioner 100 for use either alone or in conjunction with the wire positioner 42 described above. Positioner 100 can have a pair 102 of support wire engagement elements or jaws 102*a*, 102*b* configured to grip or otherwise move into position a valley 34 of a support wire 36 when the staple head 30 of the staple gun 26 approaches the valley 34. The positioner 100 can have a linkage 104 for moving the pair 102 of jaws 102*a*, 102*b* to grip the valley 34. The positioner 100 can have an actuator 106 which contacts the rail 39 of base 41 for actuating the linkage 104 and hence pair 102 of jaws 102*a*, 102*b* (FIG. 6). The actuator 106 can be spring biased via springs 108*a*, 108*b* (FIG. 7, discussed below) so as to normally position the pair 102 of jaws 102*a*, 102*b* in an open position (FIG. 5).

More particularly, the positioner 100 can have a housing 110, with each jaw 102*a*, 102*b* of the pair 102 being pivoted to the housing 110 with pivot pins 112*a*, 112*b* integral to the housing 110, which are accepted in holes 114*a*, 114*b*, respectively, in jaws 102*a*, 102*b*. The linkage 104 can include first and second links 116*a*, 116*b*. Each of the first and second links 116*a*, 116*b* can have a first end 118*a*, 118*b*, respectively, pivoted to a respective one 102*a*, 102*b* of the pair 102 of jaws with pivot pins 120*a*, 120*b* integral to the jaws 102*a*, 102*b*, respectively, which are accepted in holes 122*a*, 122*b*, respectively, in links 116*a*, 116*b*. The first and second links 116*a*, 116*b* can have second ends 124*a*, 124*b* pivoted to one another and to the actuator 106 with pivot pin 126 integral to link 116*a* which is accepted in hole 128 in link 116*b* and in hole 130 in actuator 106. When the actuator 106 is biased toward the housing 110 (FIG. 6), the first and second links 116*a*, 116*b* pivot oppositely and in doing so cause the pair 102 of jaws 102*a*, 102*b* to pivot oppositely toward a closed position around valley 34.

Actuator 106 can be accepted in a slot 132 in a lower side of housing 110. Springs 108*a*, 108*b* can be accepted in holes 134*a*, 134*b* in an upper side of housing 110 and secured with screws 136*a*, 136*b*. Actuator 106 can include a pair 138 of legs 138*a*, 138*b* which straddle the valley 34 of the support wire as the actuator 106 contacts rail 39.

Figure 7:
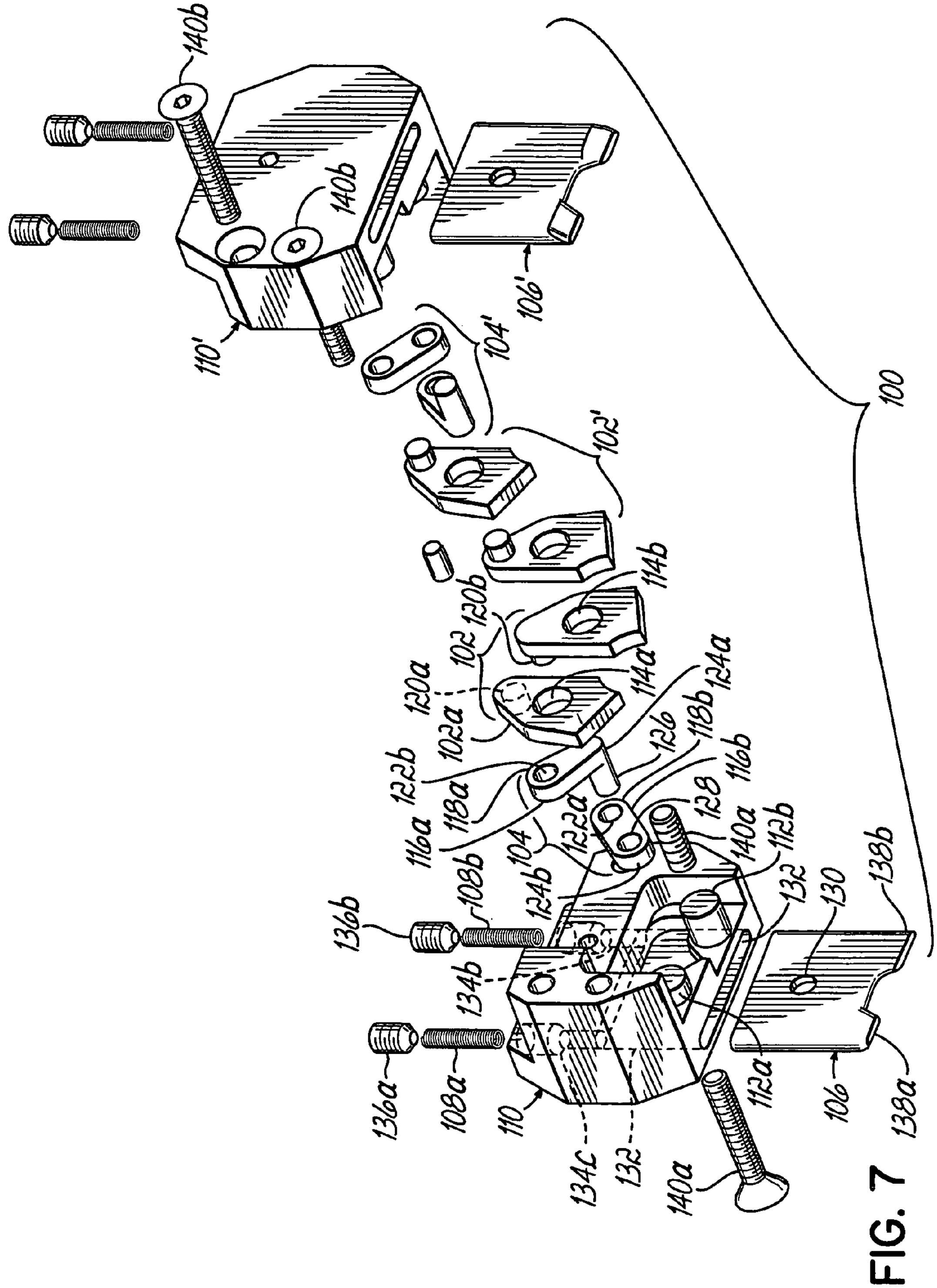
FIG. 7 is an exploded perspective view of the second wire positioner of FIGS. 4-6.

Positioner 100 can include mirror image jaw pairs 102, 102', linkages 104, 104', actuators 106, 106', and housings 110, 110', as shown in FIG. 7. Two screws 140*a* and two screws 140*b* can secure the housings 110, 110' together.

Figure 8:
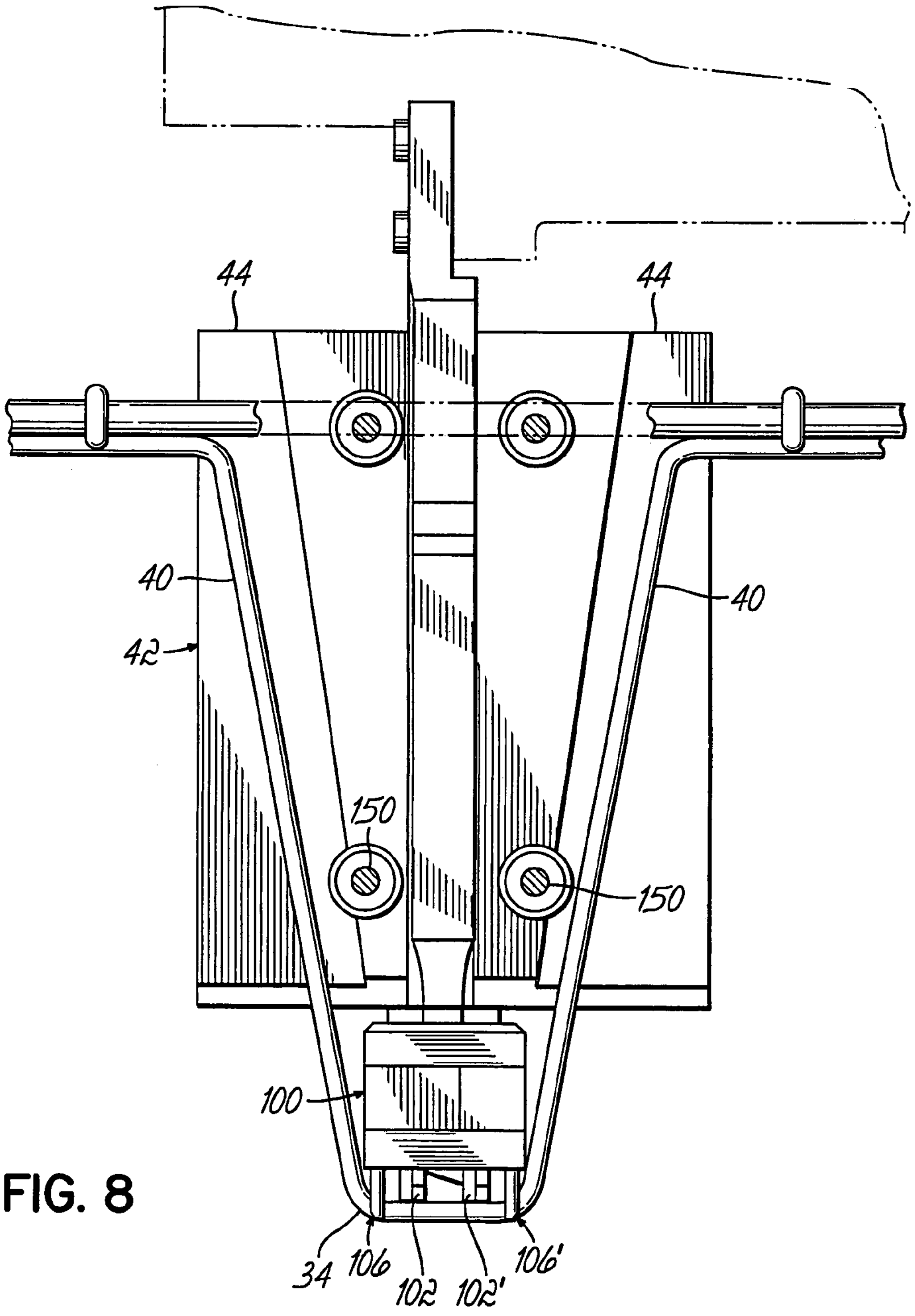
FIG. 8 is a front view of the wire positioners of FIGS. 4-7.
Figure 9:
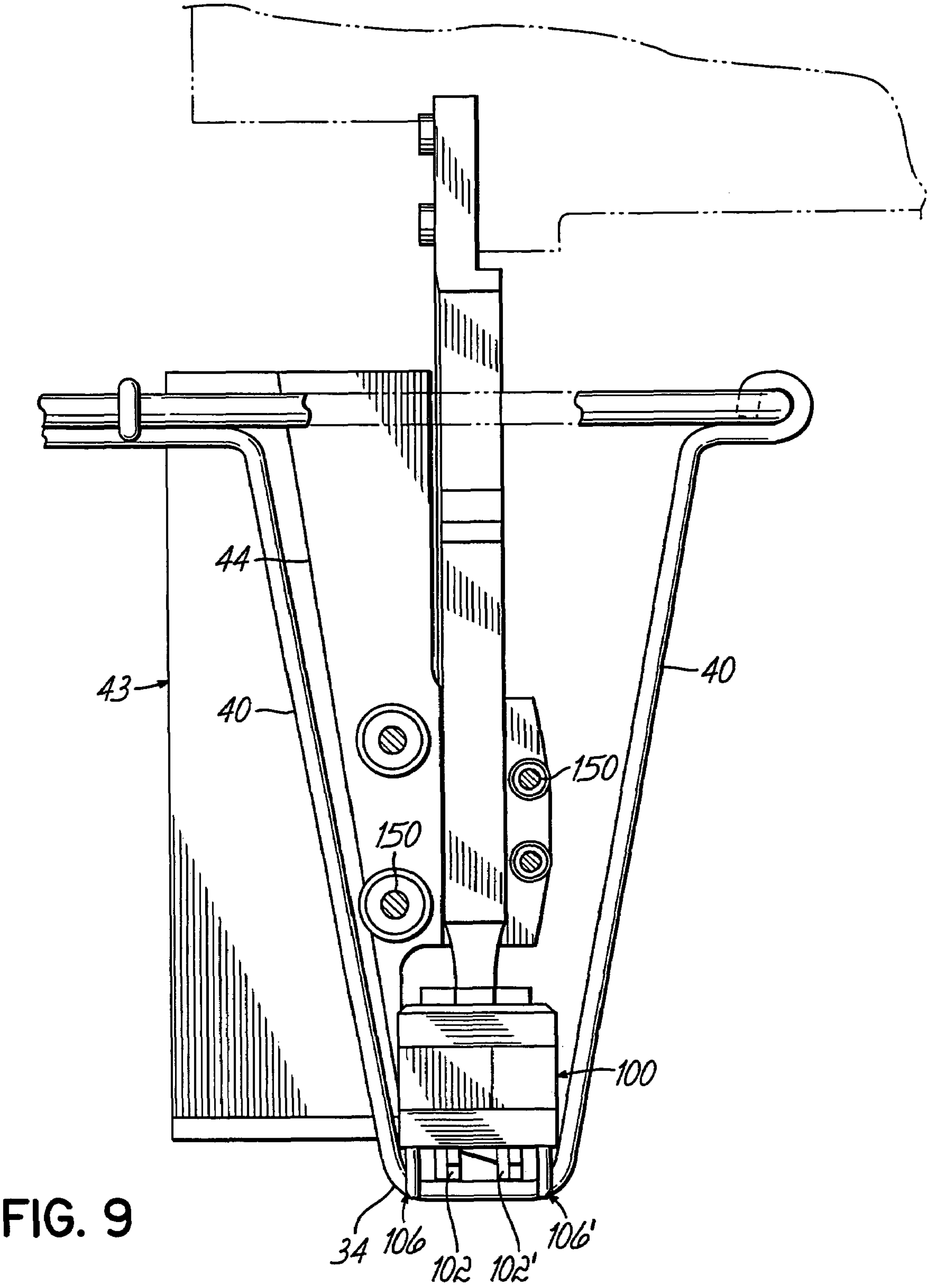
FIG. 9 is a view similar to FIG. 8 but with the first wire positioner being adapted to position the end most support wire without damaging the circumferential border wire.
Figure 10:
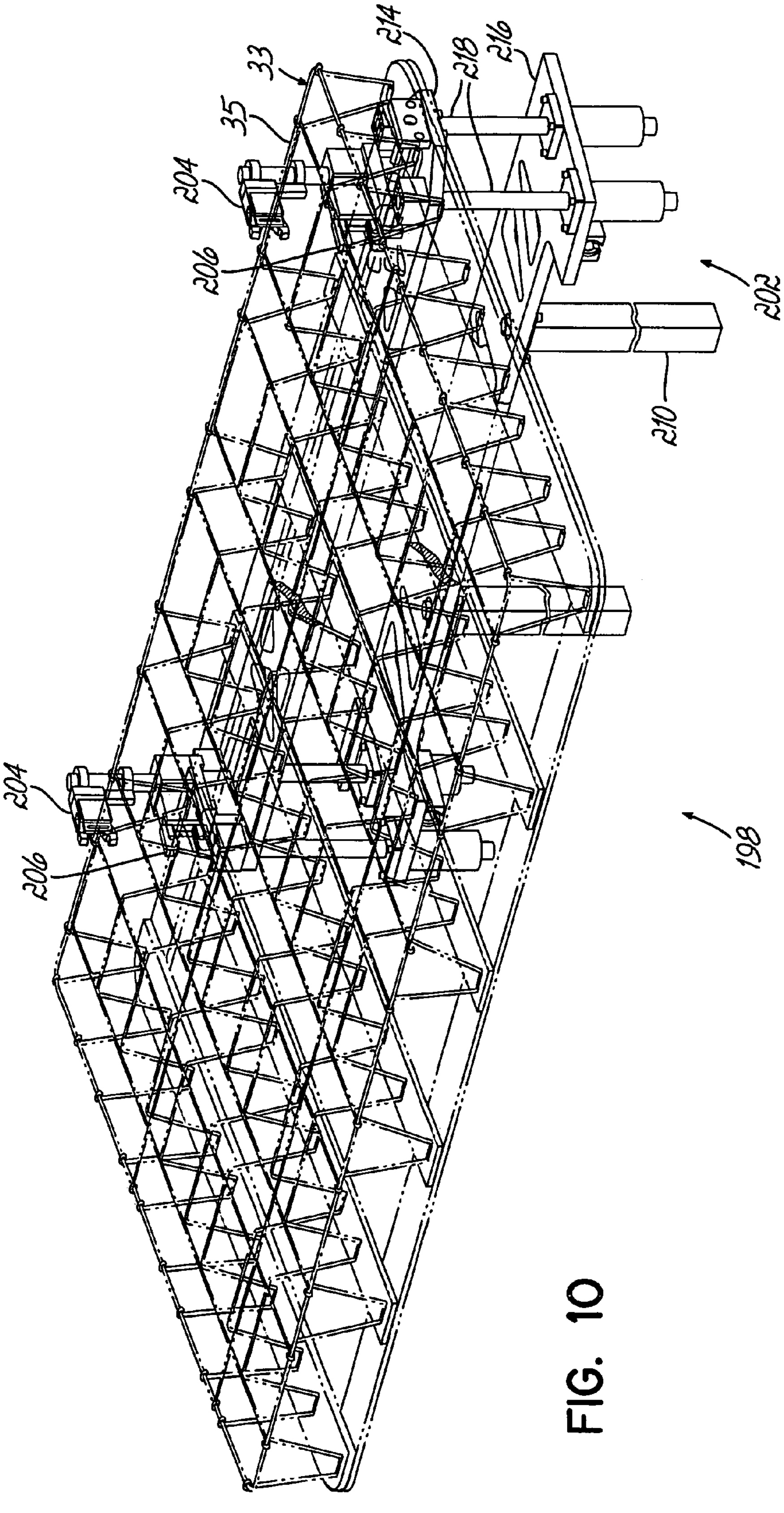
FIG. 10 is a perspective view of a bedding foundation positioning apparatus for use in conjunction with the apparatus of FIGS. 1-8.
Figure 11:
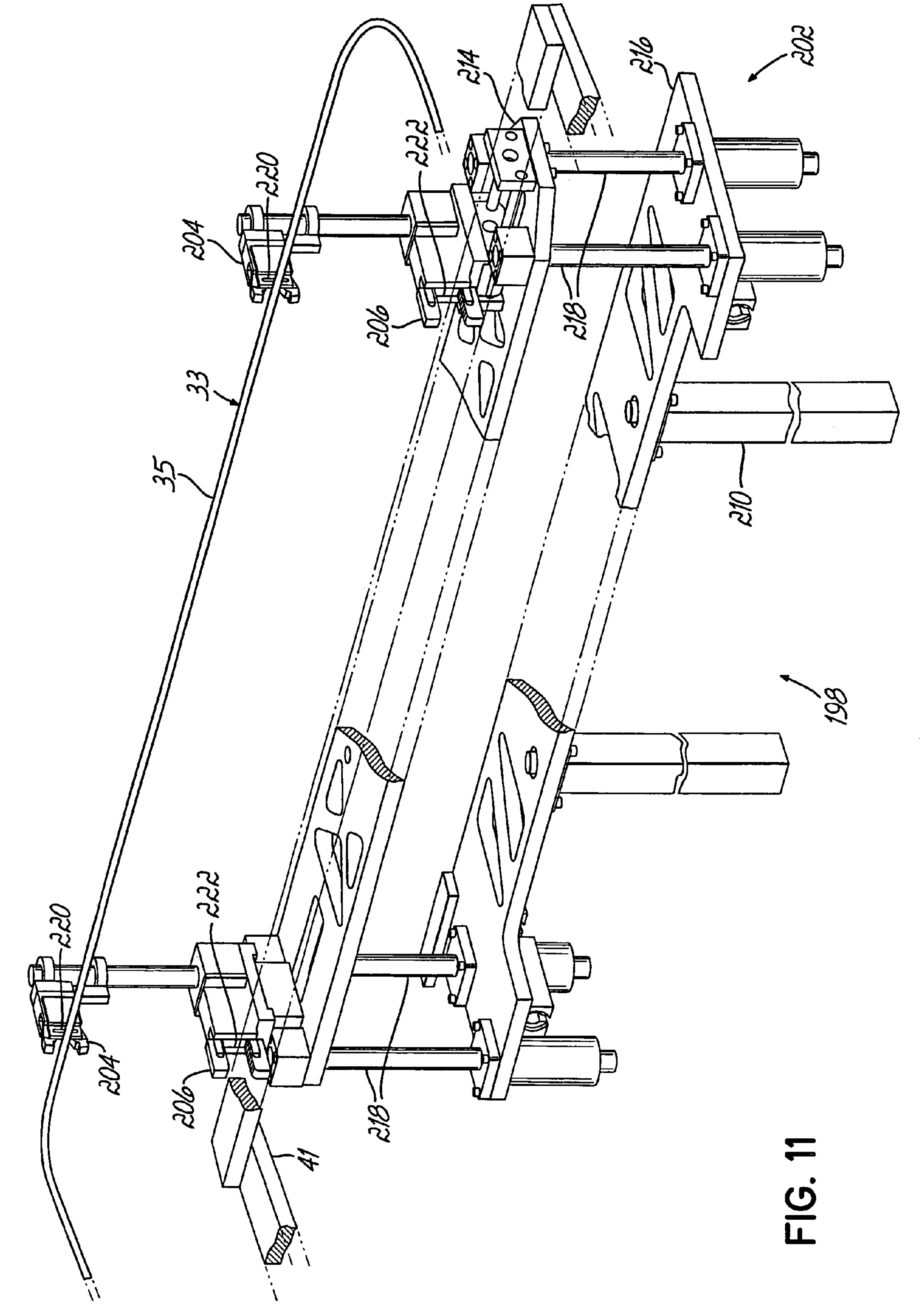
FIG. 11 is an enlarged partial perspective view of the apparatus of FIG. 9.
Figure 12:
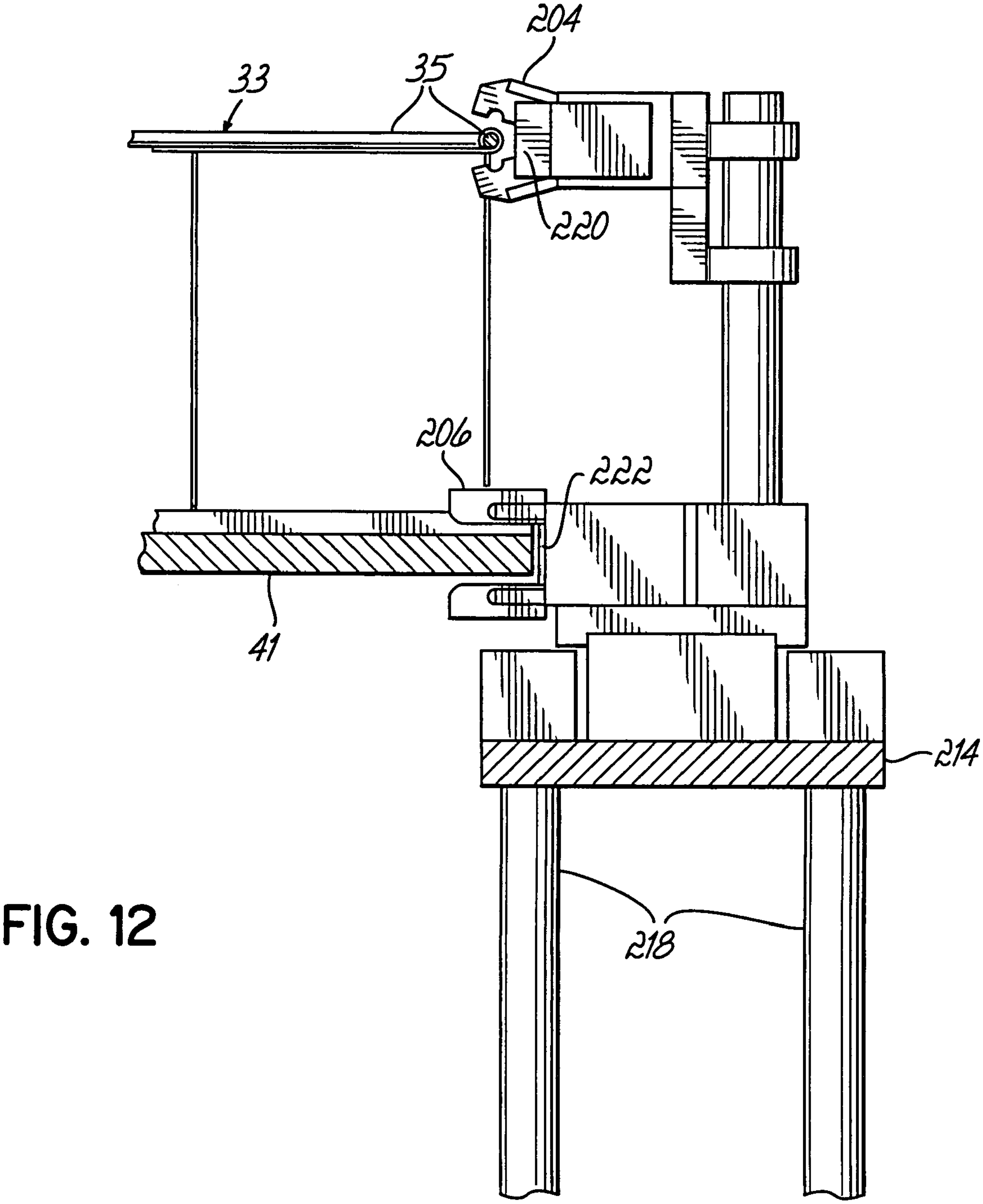
FIG. 12 is a view taken along line 11-11 in FIG. 10.
Figure 13:
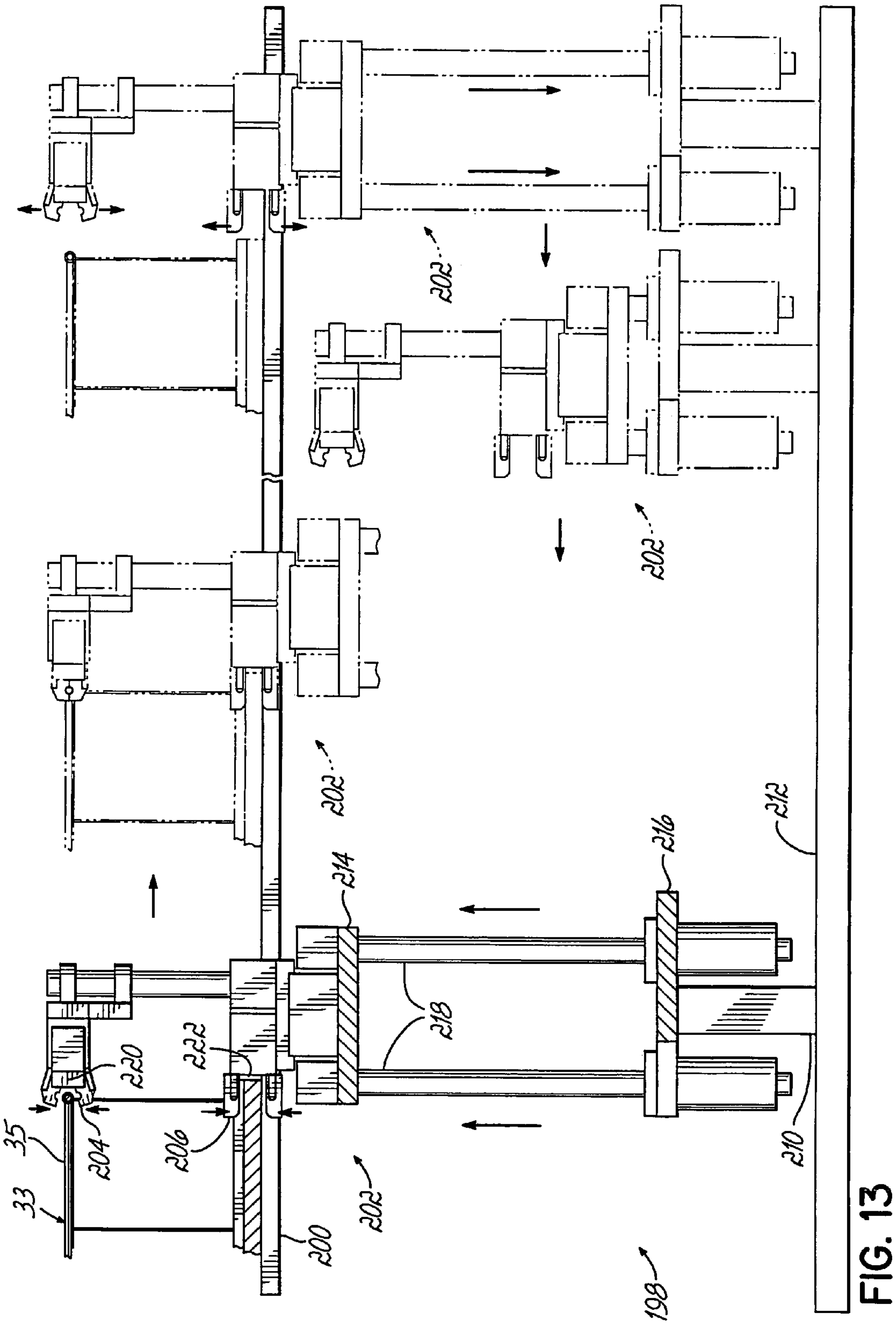
FIG. 13 is a view similar to FIG. 6 illustrating the bedding foundation positioning device positioning the bedding foundation during operation of the staple guns.

Referring now to FIGS. 8 and 9, a first wire positioner 42 (FIG. 8) for positioning interior valleys 34 is contrasted with a first wire positioner 43 (FIG. 9) for positioning edge or end valleys 34. Wire positioner 43 is essentially one half of wire positioner 42 so as to avoid damaging the circumferential border wire of the wire grid. Both positioners 42 and 43 can be fabricated in halves and can be secured together with screws 150 such that staple gun 26 is positioned between the halves.

Referring now to FIGS. 10-13, there is illustrated a bedding foundation positioning apparatus 198 for use in conjunction with either, or both, of the wire positioners discussed above. The apparatus 198 includes a support 200 for supporting the base 41 of a bedding foundation 14 and a moveable, for example horizontally moveable, carriage 202 having a first gripper or pair of grippers 204, 204 for gripping the border wire 35 of the wire grid 33 of the bedding foundation 14, and a second gripper or pair of grippers 206, 206 for gripping the base 41 of the bedding foundation 14. The carriage 202 indexes the wire grid 33 and base 41 beneath the staple gun(s) 26 so that the valleys 34 of the support wires 34 of the wire grid 33 are in position to be stapled to the rails 39 of the base 41. A processor/controller 208 (FIG. 14) controls gripping of the grippers 204, 206, horizontal movement of the carriage 202, vertical movement of the staple gun(s) 26, and stapling of the wire grid 33 to the base 41 by the staple gun(s) 26. A suitable commercially available processor/controller 208 such as a P1123-LEM001 available from Axion Technologies, Houston, Tex., can be used.

More particularly, carriage 202 can have a carriage base 210 that can be mounted for movement by, for example, rollers (not shown) on an apparatus base 212. For example, a servo drive connected to a gear box that is in turn connected to a linear actuator with an internal toothed belt (not shown) can be used to impart forward and rearward motion to the carriage 202 relative to the apparatus base 212. A suitable commercially available drive such as a H130K10000011-01800 available from Hoerbriger-Origa Corporation, Glendale Heights, Ill., can be used. Grippers 204, 206 can be mounted on a gripper support 214 above carriage base 210. An actuator support 216 can be mounted to carriage base 210 below gripper support 214. Actuators, for example pneumatic cylinders 218, can be mounted between the actuator support 216 and gripper support 214 for upward and downward movement of gripper support 214 and hence grippers 204, 206 relative to carriage base 210. The grippers 204, 206, themselves, can be, for example, pneumatically actuated. A servo motor driven ball screw (not shown) can be used to raise and lower mounting bar 24, and the staple guns 26 can be pneumatically actuated.

Figure 14:
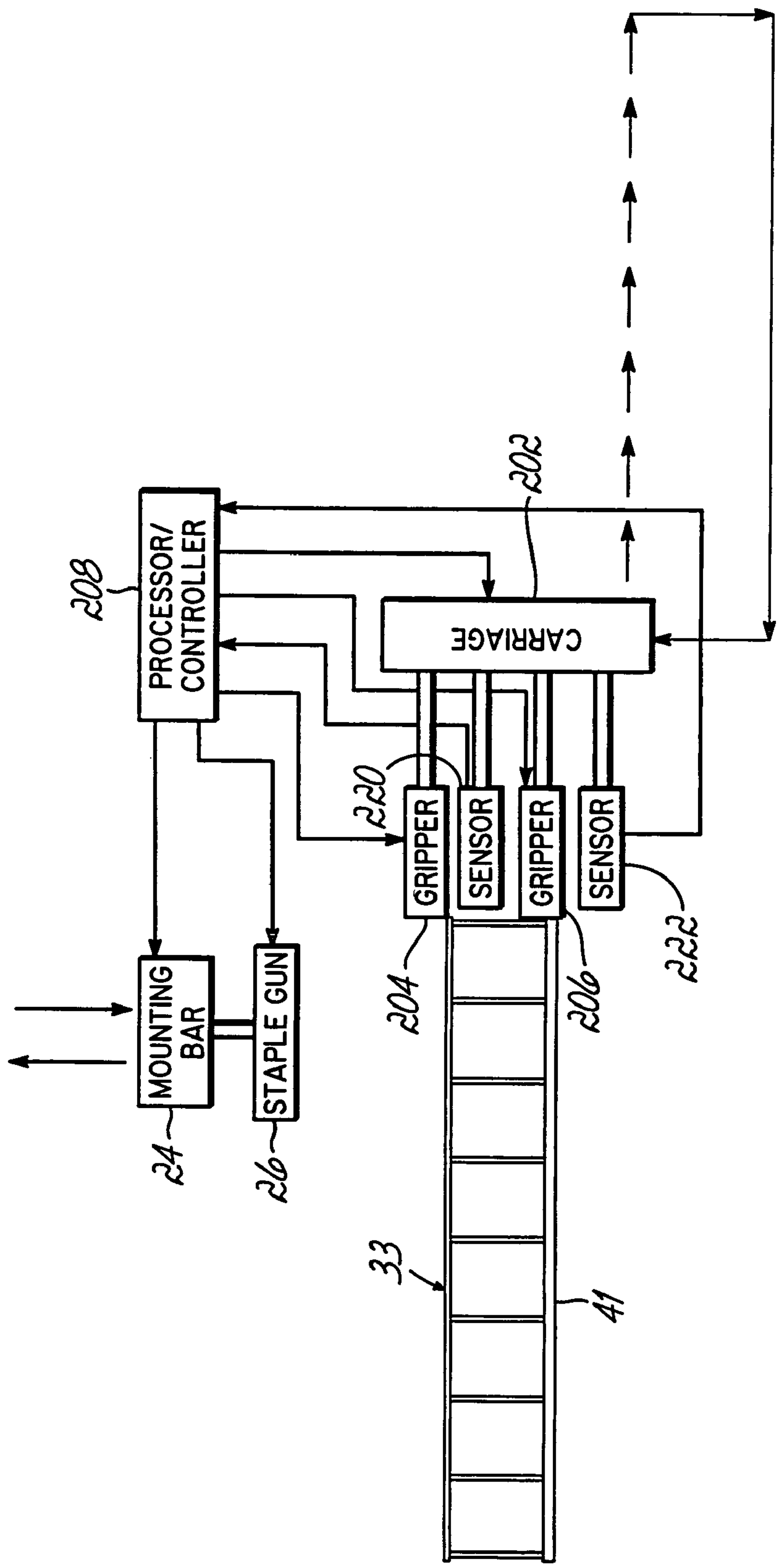
FIG. 14 is a process control block diagram of the apparatus of FIGS. 1-13.

Referring still to FIGS. 10-13, and additionally to FIG. 14 in particular, grippers 204 can have a sensor or sensors 220 and grippers 206 can have a sensor or sensors 222. Sensors 220, 222 can be configured to sense when border wire 35 of wire grid 33 is in position to be gripped by grippers 204 and base 41 of bedding foundation 14 is in position to be gripped by grippers 206. Sensors 220 can be, for example, a continuity circuit whereby grid 33 completes a low voltage circuit and sends a signal to the processor/controller to that effect. Sensors 222 can be, for example, plunger type electrical switches which send signals to the processor/controller that they have been depressed. Suitable commercially available sensors 220, 222 such as B13U-M12-AP6X-H 1141, N13-EG08K-AP6X-H1341 and SPT1-AP6X available from Turck Inc., Minneapolis, Minn., can be used. Once an operator slides a wire grid 33 and base 41 into position such that the presence of the border wire 35 of the wire grid 33 is sensed by sensors 220 and the base 41 is sensed by the sensors 222, the sensors 220, 222 can send a signal to processor/controller 208 to start a stapling cycle.

Processor/controller 208 can then send a signal to mounting bar 24 to lower staple gun(s) 26. Processor/controller 208 can then send a signal to staple gun(s) 26 to staple valley(s) 34 to rail 39 of base 41. Processor/controller 208 can then send a signal to mounting bar 24 to raise staple gun(s) 26. Processor/controller 208 can then send a signal to carriage 202 to index the bedding foundation 14 forwardly so as to place the next row of valleys 34 beneath staple gun 26. The cycle continues until all rows of support wires 36 of the wire grid 33 have been stapled to the base 41. At that time, the processor/controller 208 can send a signal to grippers 204, 206 to release the border wire 35 and base 41, respectively. Processor/controller 208 can then send a signal to carriage 202 (and/or gripper support 214) to lower the grippers 204, 206 below the level of the base 41. Processor/controller 208 can then send a signal to carriage 202 to move carriage 202 rearwardly to the horizontal starting position. Finally, processor/controller 208 can then send a signal to carriage 202 (and/or gripper support 214) to raise the grippers 204, 206 to the vertical starting position. At that time an operator can slide the next bedding foundation 14 toward the grippers 204, 206 such that the border wire 35 is sensed by sensors 220 and the base 41 is sensed by sensors 222. The processor/controller 208 can then repeat the entire cycle for this next bedding foundation. One encoder (not shown) can be employed in conjunction with the horizontally moving carriage 202 drive and another encoder (not shown) can be employed with the vertically moving staple gun mounting bar 24. The processor/controller 208 can be programmed for a specific product having a specific wire grid, wood base, etc., and the encoders can send appropriate signals to the processor/controller 208 so that the appropriate horizontal and vertical movements by the carriage 202 and/or gripper support 214 can be made to staple the specific grid to the specific base. Of course, the processor/controller 208 can be reprogrammed for another product having a different grid and base.

Although I have described several preferred embodiments of our invention, I do not intend to be limited except by the scope of the following claims.

What is claimed is:

1. An apparatus for manufacturing a bedding foundation having a base and a wire grid of support wires, said apparatus comprising:

at least one vertically moveable staple gun having a staple head and a wire positioner associated with said staple head, said wire positioner being configured to engage one of the support wires and to move and position the one support wire relative to said staple head in response to vertical movement of said staple head and while said staple head moves only vertically relative to said base such that upon activation, said staple gun staples the one support wire in the intended position to the base, wherein the support wires have peaks, valleys, and connecting segments joining the peaks and valleys, and wherein said wire positioner is configured to engage at least one of the connecting segments of a respective valley, wherein said wire positioner includes a pair of opposed grooves which engage both of the connecting segments of a respective valley and a central hole permitting passage of said staple head therethrough, wherein said wire positioner has a pair of jaws configured to grip the respective valley when said staple head approaches the valley.

2. the apparatus of claim 1 wherein said wire positioner includes a linkage for moving said pair of jaws to grip the respective valley.

3. the apparatus of claim 2 wherein said wire positioner includes an actuator which contacts the base and actuates said linkage to move said pair of jaws.

4. The apparatus of claim 3 wherein said actuator is spring biased so as to normally position said pair of jaws in an open position.

5. the apparatus of claim 3 wherein said wire positioner includes a housing, said pair of jaws pivoted to said housing, said actuator mounted for sliding movement in said housing, said linkage comprising:

first and second links, each of said first and second links having a first end pivoted to a respective one of said pair of jaws, said first and second links having second ends pivoted to one another and to said actuator, whereby when said actuator is biased toward said housing said first and second links pivot oppositely and in so doing cause said pair of jaws to pivot oppositely toward a closed position.

6. The apparatus of claim 5 wherein said actuator includes a pair of legs which straddle the valley of the respective wire.

7. The apparatus of claim 1 wherein the support wires have peaks, valleys, and connecting segments joining the peaks and valleys, and wherein there are first and second said wire positioners, said first wire positioner configured to engage at least one of the connecting segments of a respective valley, said second wire positioner configured to engage the respective valley.

8. The apparatus of claim 7 wherein said first wire positioner includes a groove which engages the at least one of the connecting segments of the respective valley.

9. The apparatus of claim 7 wherein said first wire positioner includes a pair of opposed grooves which engage both of the connecting segments of the respective valley.

10. The apparatus of claim 7 wherein said first wire positioner includes a central hole permitting passage of said staple head therethrough and a pair of opposed grooves which engage both of the connecting segments of the respective valley.

11. The apparatus of claim 7 wherein said second wire positioner has a pair of jaws configured to grip the respective valley when said staple head approaches the respective valley.

12. The apparatus of claim 11 wherein said second wire positioner includes a linkage for moving said pair of jaws to grip the respective valley.

13. The apparatus of claim 12 wherein said second wire positioner includes an actuator which contacts the base and actuates said linkage to move said pair of jaws.

14. The apparatus of claim 13 wherein said actuator is spring biased so as to normally position said pair of jaws in an open position.

15. The apparatus of claim 13 wherein said second wire positioner includes a housing, said pair of jaws pivoted to said housing, said actuator mounted for sliding movement in said housing, said linkage comprising:

first and second links, each of said first and second links having a first end pivoted to a respective one of said pair of jaws, said first and second links having second ends pivoted to one another and to said actuator, whereby when said actuator is biased toward said housing said first and second links pivot oppositely and in so doing cause said pair of jaws to pivot oppositely toward a closed position.

16. The apparatus of claim 15 wherein said actuator includes a pair of legs which straddle the valley of the respective wire.

17. An apparatus for manufacturing a bedding foundation having a base and a wire grid of support wires, said apparatus comprising:

at least one vertically moveable staple gun for stapling the wire grid to the base, a support for supporting the base, a horizontally moveable carriage having a first gripper for gripping the wire grid and positioning the wire grid relative to the base, and a second gripper for gripping the base, said carriage for indexing the wire grid and base beneath said staple gun, and a controller for controlling gripping of said grippers, horizontal movement of said carriage, vertical movement of said staple gun, and stapling of the wire grid to the base by said staple gun.

18. The apparatus of claim 17 further including a first sensor associated with said first gripper and a second sensor associated with said second gripper, said sensors for sending respective signals to said controller that the wire grid and base are in position to be gripped by said grippers and that the wire grid is in a predetermined position relative to the base.

19. The apparatus of claim 18 wherein said controller controls downward movement of said staple gun and stapling of the wire grid to the base by said staple gun such that said staple gun is moved downwardly and the wire grid is stapled to the base after the first and second grippers grip the wire grid and base, respectively.

20. The apparatus of claim 19 wherein said controller controls upward movement of said staple gun such that said staple gun is moved upwardly to a start position after the wire grid is stapled to the base.

21. The apparatus of claim 17 wherein said controller controls horizontal movement of said carriage such that the wire grid and base are progressively indexed forwardly under said staple gun so that said staple gun can completely staple the wire grid to the base.

22. The apparatus of claim 21 wherein said first and second grippers are mounted for vertical movement on said carriage and wherein said controller controls vertical movement of said grippers such that after said carriage has indexed the wire grid and base completely beneath said staple gun and said staple gun has completely stapled the wire grid to the base, said grippers are moved downwardly to a position below said support, said carriage is moved rearwardly to a start position, and said grippers are moved upwardly to a start position for gripping the wire grid and base of the next bedding foundation.

23. The apparatus of claim 17 further including a wire positioner associated with a staple head of said staple gun, said wire positioner being configured to engage and move one of the support wires and to position the one support wire relative to said staple head such that upon activation, said staple gun staples the one support wire in the intended position to the base.

24. The apparatus of claim 23 wherein the support wires have peaks, valleys, and connecting segments joining the peaks and valleys, and wherein said wire positioner is configured to engage at least one of the connecting segments of a respective valley.

25. The apparatus of claim 23 wherein said wire positioner includes a groove which engages the at least one of the connecting segments of the respective valley.

26. The apparatus of claim 23 wherein said wire positioner includes a pair of opposed grooves which engage both of the connecting segments of the respective valley.

27. The apparatus of claim 23 wherein said wire positioner includes a central hole permitting passage of said staple head therethrough and a pair of opposed grooves which engage both of the connecting segments of the respective valley.

28. The apparatus of claim 17 wherein the support wires have peaks, valleys, and connecting segments joining the peaks and valleys, and wherein said wire positioner is configured to engage a respective valley.

29. The apparatus of claim 28 wherein said wire positioner has a pair of jaws configured to grip the respective valley when said staple head approaches the valley.

30. The apparatus of claim 29 wherein said wire positioner includes a linkage for moving said pair of jaws to grip the respective valley.

31. The apparatus of claim 30 wherein said wire positioner includes an actuator which contacts the base and actuates said linkage to move said pair of jaws.

32. The apparatus of claim 31 wherein said actuator is spring biased so as to normally position said pair of jaws in an open position.

33. The apparatus of claim 31 wherein said wire positioner includes a housing, said pair of jaws pivoted to said housing, said actuator mounted for sliding movement in said housing, said linkage comprising:

first and second links, each of said first and second links having a first end pivoted to a respective one of said pair of jaws, said first and second links having second ends pivoted to one another and to said actuator, whereby when said actuator is biased toward said housing said first and second links pivot oppositely and in so doing cause said pair of jaws to pivot oppositely toward a closed position.

34. The apparatus of claim 33 wherein said actuator includes a pair of legs which straddle the valley of the respective wire.

35. The apparatus of claim 17 wherein the support wires have peaks, valleys, and connecting segments joining the peaks and valleys, and wherein there are first and second said wire positioners, said first wire positioner configured to engage at least one of the connecting segments of a respective valley, said second wire positioner configured to engage the respective valley.

36. The apparatus of claim 35 wherein said first wire positioner includes a groove which engages the at least one of the connecting segments of the respective valley.

37. The apparatus of claim 35 wherein said first wire positioner includes a pair of opposed grooves which engage both of the connecting segments of the respective valley.

38. The apparatus of claim 35 wherein said first wire positioner includes a central hole permitting passage of said staple head therethrough and a pair of opposed grooves which engage both of the connecting segments of the respective valley.

39. The apparatus of claim 35 wherein said second wire positioner has a pair of jaws configured to grip the respective valley when said staple head approaches the respective valley.

40. The apparatus of claim 39 wherein said second wire positioner includes a linkage for moving said pair of jaws to grip the respective valley.

41. The apparatus of claim 40 wherein said second wire positioner includes an actuator which contacts the base and actuates said linkage to move said pair of jaws.

42. The apparatus of claim 41 wherein said actuator is spring biased so as to normally position said pair of jaws in an open position.

43. The apparatus of claim 41 wherein said second wire positioner includes a housing, said pair of jaws pivoted to said housing, said actuator mounted for sliding movement in said housing, said linkage comprising:

first and second links, each of said first and second links having a first end pivoted to a respective one of said pair of jaws, said first and second links having second ends pivoted to one another and to said actuator, whereby when said actuator is biased toward said housing said first and second links pivot oppositely and in so doing cause said pair of jaws to pivot oppositely toward a closed position.

44. The apparatus of claim 43 wherein said actuator includes a pair of legs which straddle the valley of the respective wire.

45. An apparatus for manufacturing a bedding foundation having a base and a wire grid of support wires, said apparatus comprising:

at least one vertically moveable staple gun having a staple head and a wire positioner associated with said staple head;

said wire positioner being configured to engage one of the support wires and to position the one support wire relative to said staple head such that upon activation, said staple gun staples the one support wire in the intended position to the base;

said support wires having peaks, valleys and connecting segments joining the peaks and valleys, said wire positioner being configured to engage a respective valley;

said wire positioner having a pair of jaws configured to grip the respective valley when said staple head approaches the valley; and wherein said wire positioner includes a linkage for moving said pair of jaws to grip the respective valley.

46. An apparatus for manufacturing a bedding foundation having a base and a wire grid of support wires, said apparatus comprising:

at least one vertically moveable staple gun having a staple head and a wire positioner associated with said staple head;

said wire positioner being configured to engage one of the support wires and to position the one support wire relative to said staple head such that upon activation, said staple gun staples the one support wire in the intended position to the base;

said support wires having peaks, valleys and connecting segments forming the peaks and valleys, and wherein there are first and second wire positioners, said first wire positioner being configured to engage at least one of the connecting segments of a respective valley, said second wire positioner being configured to engage the respective valley;

said second wire positioner having a pair of jaws configured to grip the respective valley when said staple head approaches the respective valley; and wherein said second wire positioner includes a linkage for moving said pair of jaws to grip the respective valley.

47. An apparatus for manufacturing a bedding foundation having a base and a wire grid of support wires, said apparatus comprising:

at least one vertically moveable staple gun for stapling the wire grid to the base;

a support for supporting the base;

a horizontally moveable carriage having a first gripper for gripping the wire grid and a second gripper for gripping the base, said carriage for indexing the wire grid and base beneath said staple gun;

a controller for controlling gripping of said grippers, horizontal movement of said carriage, vertical movement of said staple gun, and stapling of the wire grid to the base by said staple gun;

said support wires having peaks, valleys and connecting segments joining the peaks and valleys, a wire positioner associated with a staple head of said staple gun, and wherein said wire positioner is configured to engage a respective valley;

said wire positioner having a pair of jaws configured to grip the respective valley when said staple head approaches the valley; and said wire positioner including a linkage for moving said pair of jaws to grip the respective valley.

48. An apparatus for manufacturing a bedding foundation having a base and a wire grid of support wires, said apparatus comprising:

at least one vertically moveable staple gun for stapling the wire grid to the base;

a support for supporting the base;

a horizontally moveable carriage having a first gripper for gripping the wire grid and a second gripper for gripping the base, said carriage for indexing the wire grid and base beneath said staple gun;

a controller for controlling gripping of said grippers, horizontal movement of said carriage, vertical movement of said staple gun, and stapling of the wire grid to the base by said staple gun;

said support wires having peaks, valleys and connecting segments joining the peaks and valleys, and wherein there are first and second wire positioners associated with a staple head of said staple gun;

said first wire positioner being configured to engage at least one of the connecting segments of a respective valley, said second positioner being configured to engage the respective valley; and said second wire positioner having a pair of jaws configured to grip the respective valley when said staple head approaches the respective valley.

* * * * *

UNITED STATES PATENT AND TRADEMARK OFFICE

CERTIFICATE OF CORRECTION

PATENT NO. : 7,516,533 B2
APPLICATION NO. : 11/059940
DATED : April 14, 2009
INVENTOR(S) : Niels S. Mossbeck, Franklin H. Rawlings and Michael L. Shelton It is certified that error appears in the above-identified patent and that said Letters Patent is hereby corrected as shown below:

Column 1

Line 45, "Applicant's" should be --Applicants'--.

Line 63, "applicant's" should be --applicants'--.

Column 2

Line 9, "applicant's" should be --applicants'--.

Line 28, "applicant's" should be --applicants'--.

Column 9

Line 50, "2. the apparatus" should be --2. The apparatus--.

Line 53, "3. the apparatus" should be --3. The apparatus--.

Line 59, "5. the apparatus" should be --5. The apparatus--.

Signed and Sealed this

Fifth Day of January, 2010

David J. Kappos
*Director of the United States Patent and Trademark Office*